United States Patent
Abe et al.

(10) Patent No.: US 11,244,707 B1
(45) Date of Patent: Feb. 8, 2022

(54) OPTIMIZED RE-INVENTORY FOR A TAPE LIBRARY

(71) Applicant: International Business Machines Corporation, Armonk, NY (US)

(72) Inventors: Atsushi Abe, Ebina (JP); Kazuhiro Tsuruta, Kanagawa (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/114,552

(22) Filed: Dec. 8, 2020

(51) Int. Cl.
G11B 33/04 (2006.01)
G06K 7/14 (2006.01)

(52) U.S. Cl.
CPC ............ *G11B 33/04* (2013.01); *G06K 7/1413* (2013.01)

(58) Field of Classification Search
None
See application file for complete search history.

(56) References Cited

U.S. PATENT DOCUMENTS

| | | | | |
|---|---|---|---|---|
| 4,638,171 A * | 1/1987 | Gassmann | ............. | B65G 61/00 235/461 |
| 5,280,385 A * | 1/1994 | Wybrow | ............. | G02B 27/022 206/459.5 |
| 5,544,741 A * | 8/1996 | Fantone | ................ | G11B 23/40 206/308.1 |
| 6,466,389 B1 * | 10/2002 | Ochi | ..................... | G11B 15/07 360/69 |
| 6,618,348 B1 * | 9/2003 | Coffin | ................ | G11B 15/6835 369/178.01 |
| 7,200,722 B2 | 4/2007 | Goodman | | |
| 7,472,405 B2 * | 12/2008 | Pierce | ................ | G11B 15/6835 369/30.43 |
| 9,053,738 B1 | 6/2015 | Jesionowski | | |
| 2003/0111536 A1 * | 6/2003 | Mehlberg | ............ | G06K 7/10633 235/462.01 |
| 2007/0162180 A1 * | 7/2007 | Goodman | ............ | G06Q 10/087 700/225 |
| 2009/0301978 A1 * | 12/2009 | Enderle | .............. | G11B 15/6835 211/41.12 |
| 2017/0098462 A1 | 4/2017 | Barajas Gonzalez | | |

OTHER PUBLICATIONS

"Systems and Methods to Detect Physical Inventory Manipulation in Tiered Storage Media Slots of Automated Storage Media Libraries", An IP.com Prior Art Database Technical Disclosure, Original Publication Date: Dec. 16, 2009, IP.com No. IPCOM000191110D, IP.com Electronic Publication Date: Dec. 16, 2009, 7 pages.

\* cited by examiner

Primary Examiner — William J Klimowicz
(74) Attorney, Agent, or Firm — William H. Hartwell; Aaron N. Pontikos (57) ABSTRACT

An apparatus for tape library management. The apparatus includes a storage slot that includes a plurality of mirrors integrated into the storage slot for reading a barcode affixed to each of a plurality of tape cartridges stored in a tiered orientation within the storage slot. The apparatus further includes wherein each of the plurality of mirrors are located directly below the barcode affixed to each of the plurality of tape cartridges stored in the storage slot. The apparatus further includes wherein each of the plurality of mirrors projects a reflection of the barcode affixed to each of the plurality of tape cartridges outward towards a front side of the storage slot.

22 Claims, 5 Drawing Sheets

OPTIMIZED RE-INVENTORY FOR A TAPE LIBRARY

BACKGROUND OF THE INVENTION

The present invention relates generally to tape library management, and more particularly to re-inventory operations in a tape library frame.

The growing volume of data, and the storage capacity to service information technology, has increased over the years. Other significant trends that affect planning storage strategies include data migration to cloud services and storage virtualization.

Tape cartridges have traditionally been used for video archives, back-up files, replicas for disaster recovery and retention of information on premise, but the industry is also expanding to off-premise applications in the cloud.

Tape cartridges are usually stored in huge enterprise tape libraries. In order to preserve these tape cartridges, high density tape library frames containing high density (HD) tape cartridge storage slots are utilized, where a single HD tape cartridge storage slot can hold up to five tape cartridges stacked in a row, instead of a single tape to a storage slot. Each tape cartridge in the HD tape cartridge storage slot is referenced with a tier number indicating a position within the HD tape cartridge storage slot, where the tier number increases in a depth direction as more tape cartridges are added to the HD tape cartridge storage slot.

SUMMARY

Aspects of an embodiment of the present invention disclose an apparatus, a method, a computer program product, and a computer system for tape library management.

Aspects of an embodiment of the present invention disclose an apparatus for tape library management. The apparatus includes a high density storage slot that includes a plurality of mirrors integrated into the high density storage slot for reading a barcode affixed to each of a plurality of tape cartridges stored in a tiered orientation within the high density storage slot.

Aspects of an embodiment of the present invention disclose a method for tape library management. Responsive to detecting a re-inventory request, the method includes positioning, by one or more computer processors, a tape gripper at a high density storage slot within a tape library frame, wherein the tape gripper includes an infrared barcode reader, wherein the high density storage slot includes a plurality of tape cartridges and a plurality of mirrors integrated into a bottom side of the high density storage slot, and wherein the plurality of tape cartridges include a plurality of reduced format barcodes affixed to a bottom portion of each of the plurality of tape cartridges. The method includes instructing, by the one or more computer processors, the tape gripper to read a barcode affixed to a front portion of a first tape cartridge stored at a tier one position of the high density storage slot. Responsive to a determination that the barcode affixed to the front portion of the first tape cartridge differs from a last saved barcode for the tier one position of the high density storage slot, the method includes instructing, by the one or more computer processors, the tape gripper to read one or more visible barcode reflections for one or more additional tape cartridges stored in subsequent tier positions on a depth side of the high density storage slot utilizing the plurality of mirrors integrated within the high density storage slot. The method includes updating, by the one or more computer processors, the last saved barcode for the tier one position of the high density storage slot and one or more last saved barcodes for the one or more additional tape cartridges stored in the subsequent tier positions.

Aspects of an embodiment of the present invention disclose a computer program product for tape library management. The computer program product includes program instructions to, responsive to detecting a re-inventory request, position a tape gripper at a high density storage slot within a tape library frame, wherein the tape gripper includes an infrared barcode reader, wherein the high density storage slot includes a plurality of tape cartridges and a plurality of mirrors integrated into a bottom side of the high density storage slot, and wherein the plurality of tape cartridges include a plurality of reduced format barcodes affixed to a bottom portion of each of the plurality of tape cartridges. The computer program product includes program instructions to instruct the tape gripper to read a barcode affixed to a front portion of a first tape cartridge stored at a tier one position of the high density storage slot. The computer program product includes program instructions to, responsive to a determination that the barcode affixed to the front portion of the first tape cartridge differs from a last saved barcode for the tier one position of the high density storage slot, instruct the tape gripper to read one or more visible barcode reflections for one or more additional tape cartridges stored in subsequent tier positions on a depth side of the high density storage slot utilizing the plurality of mirrors integrated within the high density storage slot. The computer program product includes program instructions to update the last saved barcode for the tier one position of the high density storage slot and one or more last saved barcodes for the one or more additional tape cartridges stored in the subsequent tier positions.

Aspects of an embodiment of the present invention disclose a computer system for tape library management. The computer system includes program instructions to, responsive to detecting a re-inventory request, position a tape gripper at a high density storage slot within a tape library frame, wherein the tape gripper includes an infrared barcode reader, wherein the high density storage slot includes a plurality of tape cartridges and a plurality of mirrors integrated into a bottom side of the high density storage slot, and wherein the plurality of tape cartridges include a plurality of reduced format barcodes affixed to a bottom portion of each of the plurality of tape cartridges. The computer system includes program instructions to instruct the tape gripper to read a barcode affixed to a front portion of a first tape cartridge stored at a tier one position of the high density storage slot. The computer system includes program instructions to, responsive to a determination that the barcode affixed to the front portion of the first tape cartridge differs from a last saved barcode for the tier one position of the high density storage slot, instruct the tape gripper to read one or more visible barcode reflections for one or more additional tape cartridges stored in subsequent tier positions on a depth side of the high density storage slot utilizing the plurality of mirrors integrated within the high density storage slot. The computer system includes program instructions to update the last saved barcode for the tier one position of the high density storage slot and one or more last saved barcodes for the one or more additional tape cartridges stored in the subsequent tier positions.

Aspects of an embodiment of the present invention disclose a computer-implemented method for tape library management. The computer-implemented method includes identifying, by a barcode reader, a barcode affixed to a first tape cartridge stored in a storage slot of a tape library frame based, at least in part, on the barcode reader reading a reflection of the barcode projected from a mirror affixed at a first position of a first surface of the storage slot.

DETAILED DESCRIPTION

Embodiments of the present invention recognize that a tape library, including one or more interconnected tape library frames, can store a plurality of tape cartridges in high density (HD) slots. Embodiments of the present invention recognize that a tape cartridge in a high density storage slot is referred with a tier number that increases in a depth direction in such a manner that a frontmost tape with respect to an opening of the high density storage slot is referred to as located at tier 1 and a next depth-side tape cartridge is referred to as located at tier 2. When only a first tape cartridge is stored in a high density storage slot, there exists a tape only at tier 1. When a second tape cartridge is added to this high density storage slot, the first tape cartridge at tier 1 is moved to tier 2 and the second tape cartridge is located at tier 1 instead, as tape cartridges on the front side are pushed in the depth direction to add additional tape cartridges.

Embodiments of the present invention recognize that a large-scale tape library includes insert and eject (IE) slots, which are dedicated slots for inserting and discharging multiple tape cartridges. In the event of inserting tape cartridges, up to sixteen tapes are inserted through IE slots, and then moved to certain physical positions automatically selected by the tape library. Therefore, the tape library knows the particular tape cartridges that are located in each high density storage slot of each tier so long as tape cartridges are added via IE slots. Embodiments of the present invention recognize, however, that it is sometimes desirable to add a large number of tape cartridges (e.g., exceeding one hundred) to a large-scale tape library. In this case, an operator opens a door of a tape library frame, adds the large number of tapes, and then closes the door. The closure of the door triggers a re-inventory operation of the tape library to move a tape gripper to that tape library frame and read the barcodes of each tape cartridge located at tier 1 in each high density storage slot within the tape library frame.

Embodiments of the present invention recognize that in a re-inventory operation, upon detection of a change between a barcode for a tape cartridge in a tier 1 location of a high density storage slot before the door of the frame is opened, and a barcode for the tape cartridge in the tier 1 location of the high density storage slot after the door is closed, the tape library retrieves the tape cartridge on the front side of the high density storage slot using the tape gripper, then reads the barcodes of all subsequent tape cartridges located at all subsequent tiers within the high density storage slot by removing each subsequent tape from the high density storage slot. A tape gripper can hold a finite number of tapes. In the case of linear tape open (LTO) tapes, a high density storage slot contains up to five tape cartridges. In such a case, the tape library temporarily evacuates the tape cartridge gripped by the tape gripper to a peripheral slot, and retrieves all tape cartridges on the depth side in order to read the barcodes. Embodiments of the present invention recognize that when a large number of tape cartridges have been added, the re-inventory operation can take several tens of minutes to several hours to complete.

Embodiments of the present invention provide for physical modifications to a tape library frame that facilitate reading barcodes of tape cartridges located depth wise with respect to a high density storage slot without actually retrieving the cartridges, thereby significantly reducing the time it takes to complete a re-inventory operation. Embodiments of the present invention reduce the time required to perform re-inventory operations by utilizing a modified high density storage slot within a tape library frame that includes a plurality of mirrors arranged on a bottom side of the high density storage slot. Embodiments of the present invention include a barcode label affixed on a label surface (front side) of a tape cartridge that is extended to a bottom side of the tape cartridge. Embodiments of the present invention utilize the plurality of mirrors during tape library re-inventory operations to read extended barcodes affixed to a bottom side of a plurality of depth side tape cartridges (those stored at tier 2-tier 5 positions within the high density storage slot), reflected by the mirrors arranged on the bottom side of the high-density cartridge storage slot, without retrieving those tape cartridges.

Implementation of such embodiments may take a variety of forms, and exemplary implementation details are discussed subsequently with reference to the Figures.

Figure 1:
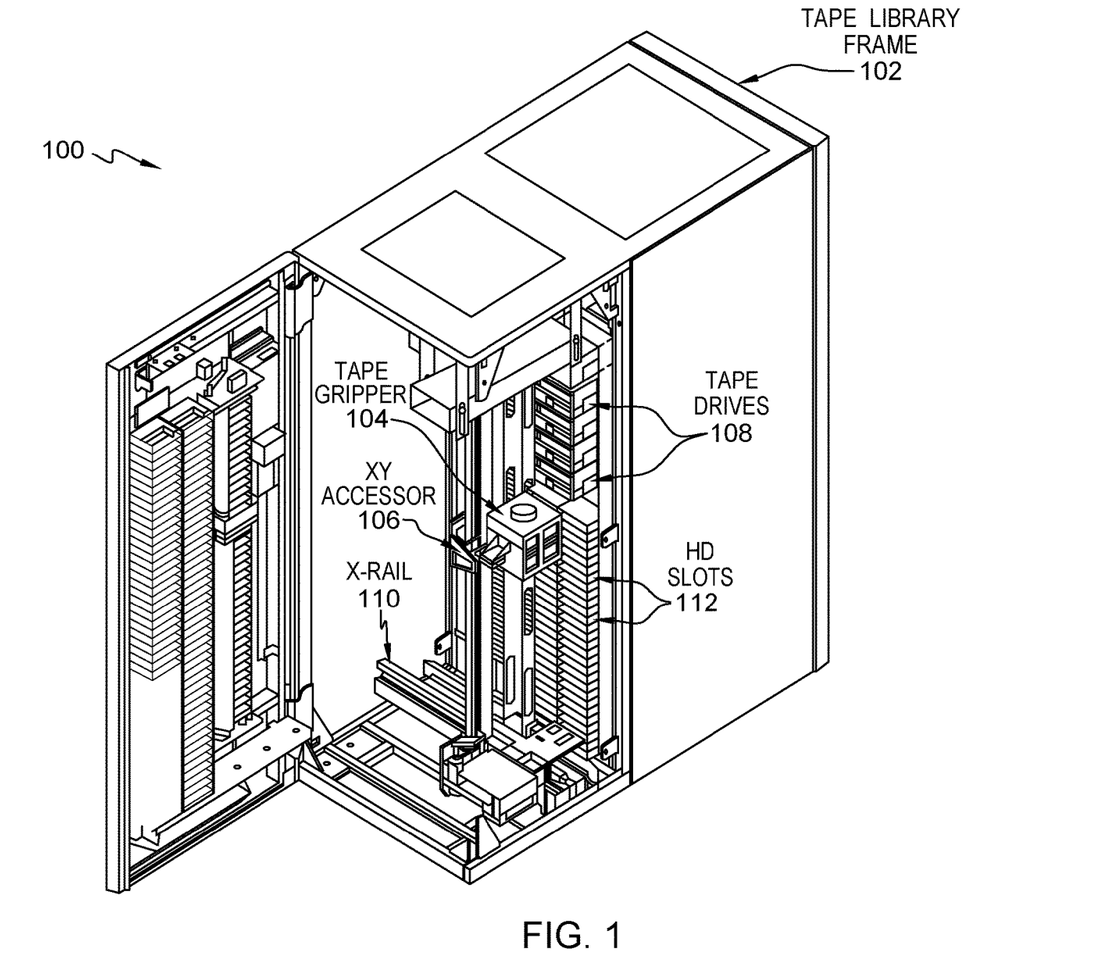
FIG. 1 illustrates a tape library management environment, in accordance with an embodiment of the present invention.

Referring now to various embodiments of the invention in more detail, FIG. 1 is a functional block diagram that illustrates a portion of a tape library management environment, generally designated 100, suitable for providing tape library management, in accordance with at least one embodiment of the invention. In one embodiment, tape library management environment 100 includes a tape library frame, such as tape library frame 102. In one embodiment, a plurality of tape library frames, such as tape library frame 102, can be interconnected to form one or more tape libraries. The one or more tape libraries can be organized into a plurality of columns evenly spaced within a floor space (i.e., within a designated space within, for example, a building, a warehouse, etc.). In another embodiment, one or more tape library frames, such as tape library frame 102, may be stacked atop the one or more tape libraries organized into the plurality of columns to satisfy demands imposed by future growth of big data tape management, within an existing floor space, by effectively building up, as opposed to building out. In one embodiment, tape library frame 102 includes one or more components, including, but not limited to, a tape gripper 104, an XY accessor 106, one or more tape drives, such as tape drives 108, an X-rail 110, and one or more high density (HD) storage slots, such as HD slots 112. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

In one embodiment, tape gripper 104 is an assembly within a tape library frame, such as tape library frame 102, for retrieving one or more tape cartridges from a plurality of tape cartridge storage slots within a tape library or one or more interconnected tape library frames similar to tape library frame 102. In one embodiment, tape gripper 104 is an assembly within tape library frame 102 for retrieving one or more tape cartridges from a plurality of high density tape cartridge storage slots, such as HD slots 112 within a tape library or one or more interconnected tape library frames similar to tape library frame 102 (i.e., within one or more interconnected tape library frames dedicated for tape storage), and transporting the one or more tape cartridges to tape drives 108 for read and write execution. In one embodiment, a tape gripper including an integrated barcode reader, such as tape gripper 104, provides the capability to read barcodes of a plurality of tape cartridges stored on a depth side (i.e., along a Z-axis) of a high density storage slot (e.g., tier 2-tier 5), without retrieving any of the tape cartridges from the high density storage slot. In one embodiment, tape gripper 104 includes an infrared barcode reader capable of reading a barcode of a tape cartridge. In an alternative embodiment, tape gripper 104 includes a charge-coupled device (CCD) camera capable of reading a barcode of a tape cartridge.

In one embodiment, XY accessor 106 is an assembly for manipulating tape gripper 104 within a tape library frame, such as tape library frame 102 and a plurality of interconnected tape library frames within a tape library. In one embodiment, XY accessor 106 is capable of moving tape gripper 104 up and down on a Y-axis, left and right on an X-axis, and diagonally on a Z-axis. XY accessor 106 includes an electronic motor (not shown), or any other suitable mechanism facilitating movement of the assembly within a tape library frame, such as tape library frame 102. For example, XY accessor 106 enables tape gripper 104 within tape library frame 102 to move up, down, left, right, and diagonally through the tape library frame, such as tape library frame 102, or one or more interconnected tape library frames until tape gripper 104 reaches a destination, such as a tape drive, such as tape drives 108, a high density tape cartridge storage slot, such as HD slots 112, or an interconnected tape library frame similar to tape library frame 102. Within that tape library frame, XY accessor 106 enables tape gripper 104 to move up a column of stored tape cartridges to retrieve a plurality of tape cartridges from one or more high density tape cartridge storage slots, such as HD slots 112, within that tape library frame. Once a tape cartridge is retrieved, XY accessor 106 enables tape gripper 104 to move back to tape library frame 102 (when moved to an interconnected tape library frame) with the plurality of retrieved tape cartridges and insert the tape into one or more tape drives, such as tape drives 108 for executing read and write information. In one embodiment, XY accessor 106 enables a tape gripper including an integrated barcode reader, such as tape gripper 104, to move to a high density tape cartridge storage slot, such as HD slots 112, during a re-inventory operation to read a barcode on a front side of a tape cartridge stored in a tier 1 position within the high density tape cartridge storage slot.

In one embodiment, tape drives 108 are data storage devices for executing read and write information on one or more tape cartridges. In one embodiment, tape drives 108 are arranged in a column within tape library frame 102. In one embodiment, tape drives 108 and the one or more tape cartridges are stored separately within tape library frame 102, or within a tape library including one or more tape library frames, such as tape library frame 102 (i.e., tapes are stored separately from tape drives 108, in one or more tape library frames dedicated for tape storage).

In one embodiment, X-rail 110 is a rail assembly enabling XY accessor 106 to move left and right (i.e., along an X-axis) within a tape library to one or more interconnected tape library frames similar to tape library frame 102. In one embodiment, XY accessor 106 is attached to X-rail 110 by a wheel-on-rail assembly, or any other suitable mechanism for attaching an accessor assembly to a rail to facilitate movement of a tape gripper, such as tape gripper 104, between one or more interconnected tape library frames along an X-axis.

In one embodiment, HD slots 112 are high density storage slots within a tape library frame, such as tape library frame 102, capable of storing up to five tape cartridges (5×) stacked in a row within a single slot space within the tape library frame. For example, high density storage slots, such as HD slots 112, are capable of storing up to five tape cartridges in a tiered orientation, with a tier 5 position on linear tape open (LTO) tape cartridges being a first tape cartridge loaded into the slot (rear-most tape cartridge on a depth side of a tape library frame), and a tier 1 position being a last tape cartridge loaded into the slot (forward-most tape cartridge on a front side of a tape library frame). Where a tier 5 position LTO tape cartridge is requested, the LTO tape cartridges forward of it (up to four cartridges), need to be removed in order to access the requested LTO tape cartridge. In alternative embodiments, high density storage slots, such as HD slots 112, are capable of storing up to four tape cartridges in a tiered orientation, with a tier 4 position on enterprise tape cartridges being a first tape cartridge loaded into the slot (rear-most tape cartridge), and a tier 1 position being a last tape cartridge loaded into the slot (forward-most tape cartridge). Where a tier 4 position enterprise tape cartridge is requested, the enterprise tape cartridges forward of it (up to three cartridges), need to be removed in order to access the requested enterprise tape cartridge. However, it should be appreciated that embodiments of the present invention may be practiced with tape library frames having any number of tiered positions within a storage slot.

In one embodiment, HD slots 112 include a physical modification integrated into a housing of HD slots 112 that provides the capability to read a barcode for each of a plurality of tape cartridges stored on a depth side of HD slots 112, without removing or retrieving any of the plurality of tape cartridges from the high density storage slots. In one embodiment, HD slots 112 include a plurality of mirrors integrated into a housing of HD slots 112. In one embodiment, HD slots 112 include a plurality of mirrors integrated into an interior bottom side of the structure (i.e., housing) of each of the high density storage slots, where a number of mirrors in the plurality of mirrors is equal to a number of tiers in a high density storage slot minus one. For example, in a high density storage slot storing LTO tape cartridges, the number of mirrors integrated into the interior bottom side of the high density storage slot is four; one mirror arranged at tier 2, one mirror arranged at tier 3, one mirror at tier 4, and one mirror arranged at tier 5. In an alternative example, in a high density storage slot storing enterprise tape cartridges, the number of mirrors integrated into the interior bottom side of the high density storage slot is three; one mirror arranged at tier 2, one mirror arranged at tier 3, and one mirror arranged at tier 4. In one embodiment, the plurality of mirrors in a high density storage slot, such as HD slots 112, provide the capability to project a reflection of a barcode, integrated into a bottom portion of a tape cartridge stored at each tier within the high density storage slot, forward towards a front side of the high density storage slot, such that a tape gripper including an integrated barcode reader, such as tape gripper 104, can read the reflection of the barcode without retrieving the tape cartridge. HD slots 112 are discussed in further detail below with respect to FIG. 2A, FIG. 2B, and FIG. 2C.

Figure 2A:
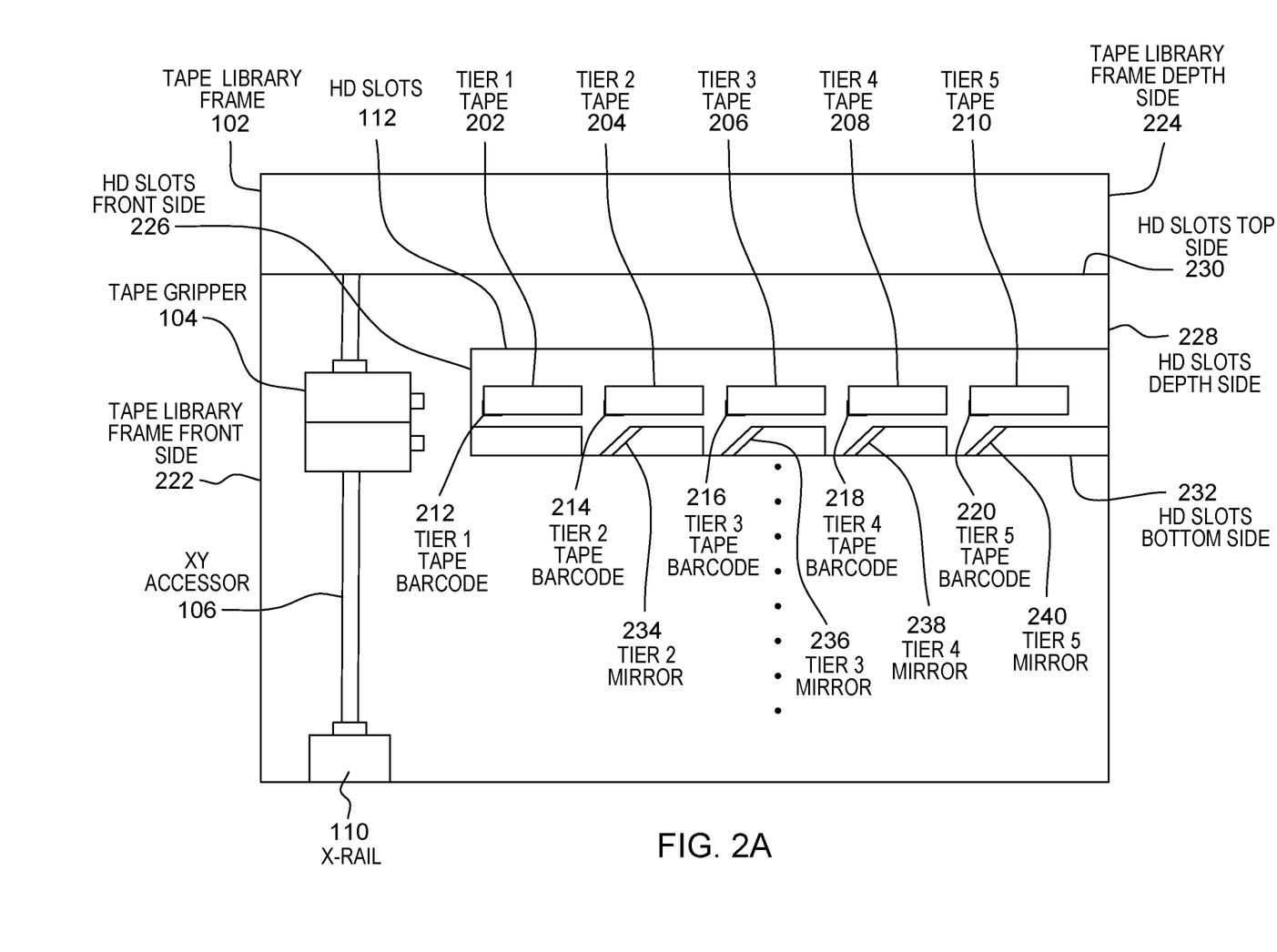
FIG. 2A is a configuration diagram of a high density tape cartridge storage slot within a tape library frame, in accordance with an embodiment of the present invention.

FIG. 2A is a configuration diagram of a high density storage slot of a tape library frame, such as HD slots 112 of tape library frame 102, in accordance with an embodiment of the present invention.

In one embodiment, a high density storage slot, such as HD slots 112, includes a physical modification to a housing of the high density storage slot that provides the capability to read barcodes from each of a plurality of tape cartridges stored on a depth side of the high density storage slot without physically retrieving any of the plurality of tape cartridges to reduce time during re-inventory operations. FIG. 2A depicts a side view of tape library frame 102 that includes tape gripper 104, XY accessor 106, X-rail 110, and a high density storage slot, such as HD slots 112. In one embodiment, HD slots 112 is oriented within tape library frame 102 such that HD slots front side 226 is facing tape library frame front side 222, and the HD slots depth side 228 is facing tape library frame depth side 224 along a Z-axis.

In one embodiment, the high density storage slot, such as HD slots 112, includes a plurality of tape cartridges, such as tier 1 tape 202, tier 2 tape 204, tier 3 tape 206, tier 4 tape 208, and tier 5 tape 210, each stored in a tiered orientation beginning with tier 1 tape 202 located in a tier 1 position at HD slots front side 226, and ending with tier 5 tape 210 located in a tier 5 position at HD slots depth side 228 (i.e., along a Z-axis). In one embodiment, each of tier 1 tape 202, tier 2 tape 204, tier 3 tape 206, tier 4 tape 208, and tier 5 tape 210 include a barcode, such as tier 1 tape barcode 212, tier 2 tape barcode 214, tier 3 tape barcode 216, tier 4 tape barcode 218, and tier 5 tape barcode 220, respectively. In one embodiment, each barcode includes specific information that uniquely identifies each respective tape cartridge. In one embodiment, each of tier 1 tape barcode 212, tier 2 tape barcode 214, tier 3 tape barcode 216, tier 4 tape barcode 218, and tier 5 tape barcode 220 are affixed (e.g., glued, adhered, etched, engraved, etc.) to a front portion, and extend (i.e., wrap around and affixed) to a bottom portion, of tier 1 tape 202, tier 2 tape 204, tier 3 tape 206, tier 4 tape 208, and tier 5 tape 210, respectively, in a shape resembling an uppercase letter "L". In an alternative embodiment, each of tier 1 tape barcode 212, tier 2 tape barcode 214, tier 3 tape barcode 216, tier 4 tape barcode 218, and tier 5 tape barcode 220 can additionally extend to an upper portion (not shown) opposite of HD slots bottom side 232 and one or more lateral sides (not shown) adjacent to HD slots front side 226 of tier 1 tape 202, tier 2 tape 204, tier 3 tape 206, tier 4 tape 208, and tier 5 tape 210, respectively.

In one embodiment, the high density storage slot, such as HD slots 112, includes a plurality of mirrors, such as tier 2 mirror 234, tier 3 mirror 236, tier 4 mirror 238, and tier 5 mirror 240, integrated into an interior bottom side, such as HD slots bottom side 232, of the high density storage slot beginning at a tier two position within the high density storage slot and ending at a tier five position within the high density storage slot (i.e., along a Z-axis), and located directly below tier 2 tape barcode 214, tier 3 tape barcode 216, tier 4 tape barcode 218, and tier 5 tape barcode 220, respectively. In one embodiment, each of tier 2 mirror 234, tier 3 mirror 236, tier 4 mirror 238, and tier 5 mirror 240 are oriented to form an obtuse angle with HD slots bottom side 232, with a top portion of each mirror shifted backward towards HD slots depth side 228 and a bottom portion of each mirror shifted forward towards HD slots front side 226, thereby positioning a front facing surface of each mirror at an upward facing obtuse angle towards HD slots top side 230. In one embodiment, each of tier 2 mirror 234, tier 3 mirror 236, tier 4 mirror 238, and tier 5 mirror 240 are oriented at any angle that provides a reflection of each of tier 2 tape barcode 214, tier 3 tape barcode 216, tier 4 tape barcode 218, and tier 5 tape barcode 220, respectively, projected outward towards HD slots front side 226 (i.e., along a Z-axis) to be read by tape gripper 104 utilizing an integrated infrared barcode reader.

In one embodiment, to accommodate integration of the plurality of mirrors within the high density storage slot, such as tier 2 mirror 234, tier 3 mirror 236, tier 4 mirror 238, and tier 5 mirror 240 within HD slots 112, a height measurement of the high density storage slot is increased (e.g., by five millimeters (5 mm) per each high density storage slot) within a tape library frame, such as tape library frame 102. Thus, if a tape library frame includes forty-four (44) high density storage slots per one vertical column of storage slots within the tape library frame, a height measurement of a vertical column within the tape library frame, such as tape library frame 102, increases by two-hundred and twenty millimeters (220 mm) in total. However, as a tape library frame, such as tape library frame 102, includes interior unused space, an increase in a height measurement of a vertical column by 220 mm has no impact on a number of high density storage slots, such as HD slots 112, that can be utilized in the tape library frame.

Figure 2B:
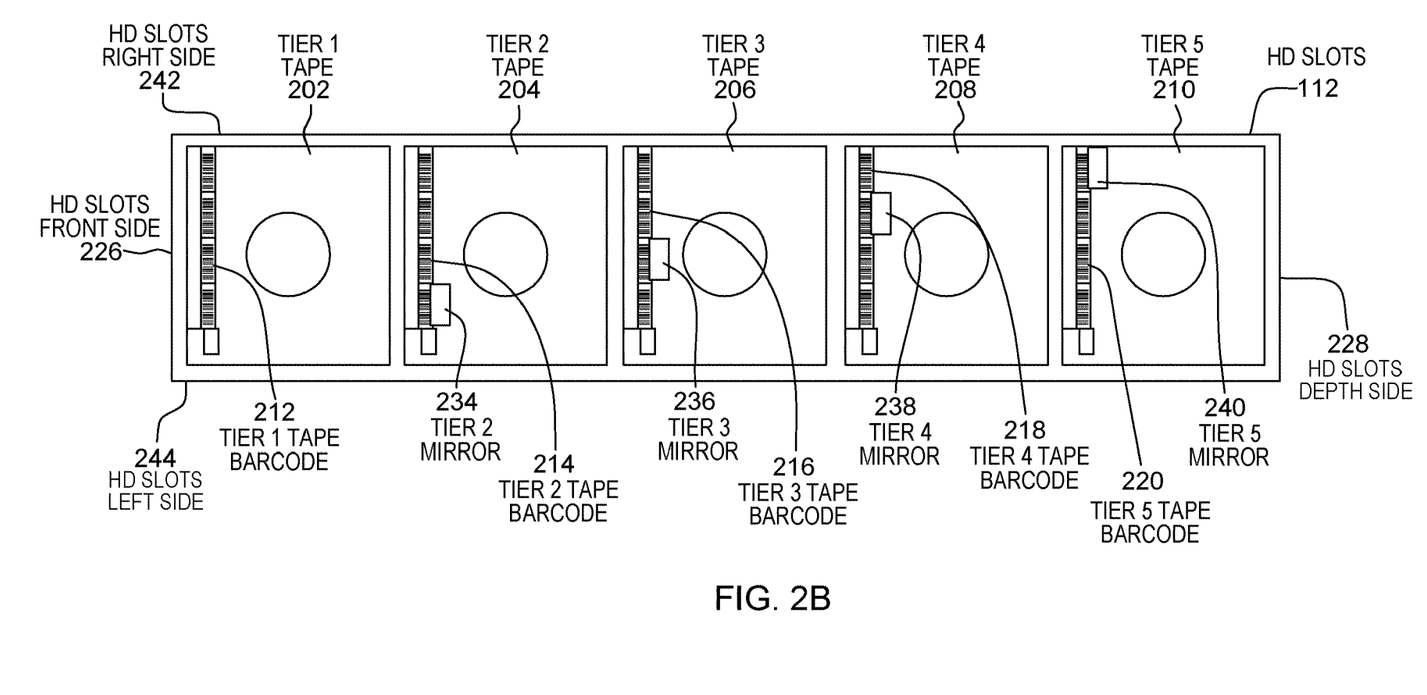
FIG. 2B is a configuration diagram of an underside view of a high density tape cartridge storage slot of a tape library frame, in accordance with an embodiment of the present invention.

FIG. 2B is a configuration diagram of a bottom view of a high density storage slot of a tape library frame, such as HD slots 112 of tape library frame 102, in accordance with an embodiment of the present invention.

In one embodiment, a high density storage slot, such as HD slots 112, includes a plurality of tape cartridges, such as tier 1 tape 202, tier 2 tape 204, tier 3 tape 206, tier 4 tape 208, and tier 5 tape 210, each stored in a tiered orientation beginning with tier 1 tape 202 located in a tier 1 position at HD slots front side 226, and ending with tier 5 tape 210 located in a tier 5 position at HD slots depth side 228 (i.e., along a Z-axis). In one embodiment, each of tier 1 tape 202, tier 2 tape 204, tier 3 tape 206, tier 4 tape 208, and tier 5 tape 210 include a barcode, such as tier 1 tape barcode 212, tier 2 tape barcode 214, tier 3 tape barcode 216, tier 4 tape barcode 218, and tier 5 tape barcode 220, respectively. In one embodiment, each of tier 1 tape barcode 212, tier 2 tape barcode 214, tier 3 tape barcode 216, tier 4 tape barcode 218, and tier 5 tape barcode 220 are shown extending to a bottom portion of tier 1 tape 202, tier 2 tape 204, tier 3 tape 206, tier 4 tape 208, and tier 5 tape 210, respectively.

In one embodiment, each of tier 1 tape barcode 212, tier 2 tape barcode 214, tier 3 tape barcode 216, tier 4 tape barcode 218, and tier 5 tape barcode 220 extending to the bottom portion of tier 1 tape 202, tier 2 tape 204, tier 3 tape 206, tier 4 tape 208, and tier 5 tape 210, respectively, are copied in a reduced format from the barcode affixed to a front portion of each respective tape (shown in FIG. 2A), and include the same information as the barcode affixed to the front portion of each respective tape. In one embodiment, each of tier 1 tape barcode 212, tier 2 tape barcode 214, tier 3 tape barcode 216, tier 4 tape barcode 218, and tier 5 tape barcode 220 extending to the bottom portion of tier 1 tape 202, tier 2 tape 204, tier 3 tape 206, tier 4 tape 208, and tier 5 tape 210, respectively, are arranged four (4) times in a reduced format in a lateral direction (i.e., laterally, along an X-axis) beginning at a portion of each respective tape cartridge adjacent to HD slots left side 244, and ending at a portion of each respective tape cartridge adjacent to HD slots right side 242. In one embodiment, each of tier 1 tape 202, tier 2 tape 204, tier 3 tape 206, tier 4 tape 208, and tier 5 tape 210 will include a first instance, a second instance, a third instance, and a fourth instance of each of tier 1 tape barcode 212, tier 2 tape barcode 214, tier 3 tape barcode 216, tier 4 tape barcode 218, and tier 5 tape barcode 220, respectively, where the first instance is nearest to HD slots left side 244 of HD slots 112 and the fourth instance is nearest to HD slots right side 242 of HD slots 112.

In one embodiment, each of tier 2 mirror 234, tier 3 mirror 236, tier 4 mirror 238, and tier 5 mirror 240 are arranged in a staggered lateral layout beginning at a position below a first instance of the reduced format of tier 2 tape barcode 214 extending to the bottom portion of tier 2 tape 204 adjacent to HD slots left side 244, and ending at a position below a fourth instance of the reduced format of tier 5 tape barcode 220 extending to the bottom portion of tier 5 tape 210 adjacent to HD slots right side 242 (i.e., along an X-axis). In one embodiment, the staggered lateral layout of each of tier 2 mirror 234, tier 3 mirror 236, tier 4 mirror 238, and tier 5 mirror 240 provides the capability for a tape gripper, such as tape gripper 104, to read each of tier 2 tape barcode 214, tier 3 tape barcode 216, tier 4 tape barcode 218, and tier 5 tape barcode 220 simultaneously, without necessitating retrieval of any of the plurality of tape cartridges. In one embodiment, a tape gripper, such as tape gripper 104, can leverage each of tier 2 mirror 234, tier 3 mirror 236, tier 4 mirror 238, and tier 5 mirror 240 to simultaneously read all the barcodes for each tape cartridge stored within HD slots 112 from a front side of the high density storage slot instantly without having to move and reposition within the tape library frame.

Figure 2C:
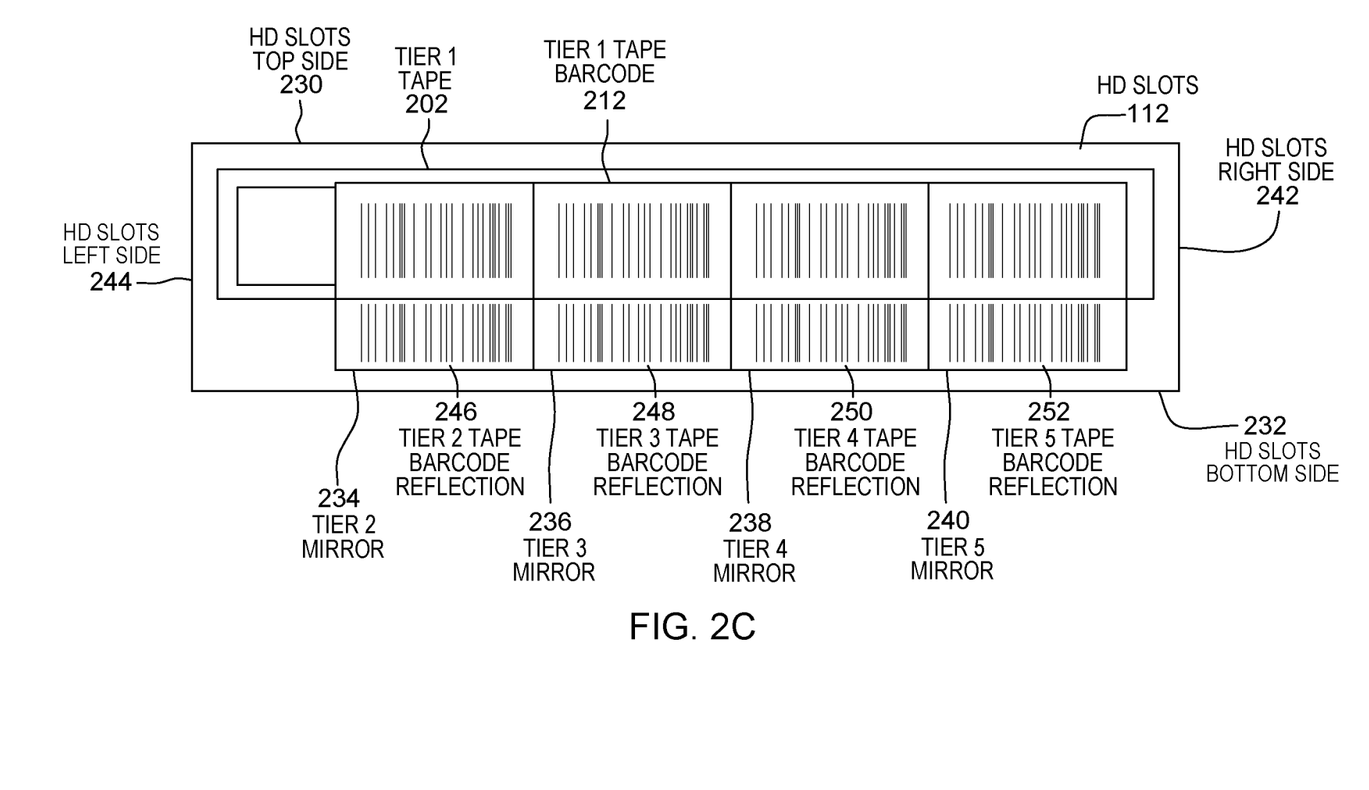
FIG. 2C is a configuration diagram of a tape cartridge within a high density tape cartridge storage slot of a tape library frame, in accordance with an embodiment of the present invention.

FIG. 2C is a configuration diagram of a front view of a high density storage slot of a tape library frame, such as HD slots 112 of tape library frame 102, in accordance with an embodiment of the present invention.

FIG. 2C illustrates a front view of a high density storage slot, such as HD slots 112, from the perspective of a tape gripper within a tape library frame, such as tape gripper 104 of tape library frame 102 (i.e., looking into HD slots 112 depth wise along a Z-axis). In one embodiment, tier 1 tape 202 and tier 1 tape barcode 212 are nearest to HD slots top side 230, and represent the only tape cartridge visible from a front side view of HD slots 112. In one embodiment, beginning at a position nearest to HD slots left side 244, tier 2 mirror 234, tier 3 mirror 236, tier 4 mirror 238, and tier 5 mirror 240 are shown integrated with HD slots bottom side 232 in a staggered lateral layout, ending at a position nearest to HD slots right side 242 (i.e., along an X-axis). In one embodiment, each of tier 2 mirror 234, tier 3 mirror 236, tier 4 mirror 238, and tier 5 mirror 240 are visible from a front side view of HD slots 112, and project a barcode reflection outward to the front side of HD slots 112 (i.e., along a Z-axis), such as tier 2 tape barcode reflection 246, tier 3 tape barcode reflection 248, tier 4 tape barcode reflection 250, and tier 5 tape barcode reflection 252, respectively, of a reduced format barcode instance affixed to a bottom portion of a tape cartridge stored at each respective tier subsequent to tier 1 on a depth side of HD slots 112 (see FIG. 2B). In one embodiment, the front view of HD slots 112, illustrated in FIG. 2C, highlights the capability of HD slots 112 to facilitate a tape gripper, such as tape gripper 104, to identify all barcodes for all tape cartridges stored at any position within a high density storage slot by reading the tier 1 position and the visible barcode reflections from tier 2, tier 3, tier 4, and tier 5 positions provided by the plurality of mirrors integrated within the bottom portion of the high density storage slot, which eliminates any necessity to retrieve tape cartridges located on the depth side of the high density slot in order to identify those tape cartridges.

For example, based on a re-inventory operation scenario, functionality provided by components of a tape library frame, such as tape library frame 102, as discussed above with respect to FIG. 2A, FIG. 2B, and FIG. 2C, will be dependent upon a tape library system detecting re-inventory requests. Responsive to detecting a door to a tape library frame is closed (or any other conceivable request that would require taking inventory of a plurality of tape cartridges within a plurality of high density storage slots, the tape library system instructs an accessor, such as XY accessor 106, to position a tape gripper including an infrared barcode reader, such as tape gripper 104, at a high density storage slot, such as HD slots 112, containing a tape cartridge at a tier 1 position, such as tier 1 tape 202. The tape library system instructs tape gripper 104 to begin reading a barcode of the tape cartridge stored in the tier 1 position within the high density storage slot, such as tier 1 tape barcode 212 of tier 1 tape 202. Responsive to a determination that the barcode of the tape cartridge stored in the tier 1 position differs from a last stored barcode for the tier one position within the high density storage slot, the tape library system instructs tape gripper 104 to begin reading a barcode of additional tape cartridges, such as tier 2 tape barcode 214 of tier 2 tape 204, tier 3 tape barcode 216 of tier 3 tape 206, tier 4 tape barcode 218 of tier 4 tape 208, and tier 5 tape barcode 220 of tier 5 tape 210, stored in each of a tier two position, a tier three position, a tier four position, and a tier five position within the high density storage slot. Tape gripper 104 is capable of reading the barcode of the additional tape cartridges stored in subsequent tier positions without retrieving any of the additional tape cartridges from the high density storage slot by utilizing a plurality of mirrors integrated within an internal bottom side of the high density storage slot, such as tier 2 mirror 234, tier 3 mirror 236, tier 4 mirror 238, and tier 5 mirror 240, that provide a barcode reflection, such as tier 2 tape barcode reflection 246, tier 3 tape barcode reflection 248, tier 4 tape barcode reflection 250, and tier 5 tape barcode reflection 252, of the barcode of each of the additional tape cartridges stored at the tier two position, the tier three position, the tier four position, and the tier five position within the high density storage slot. The tape library system instructs the last stored barcode for the tier one position, the tier two position, the tier three position, the tier four position, and the tier five position within the high density storage slot to be updated with each of the read barcodes. Responsive to updating the last stored barcodes for each position within the high density storage slot, the tape library system instructs XY accessor 106 to move tape gripper 104 to a next high density storage slot to continue reading barcodes until the re-inventory operation is complete.

Figure 3:
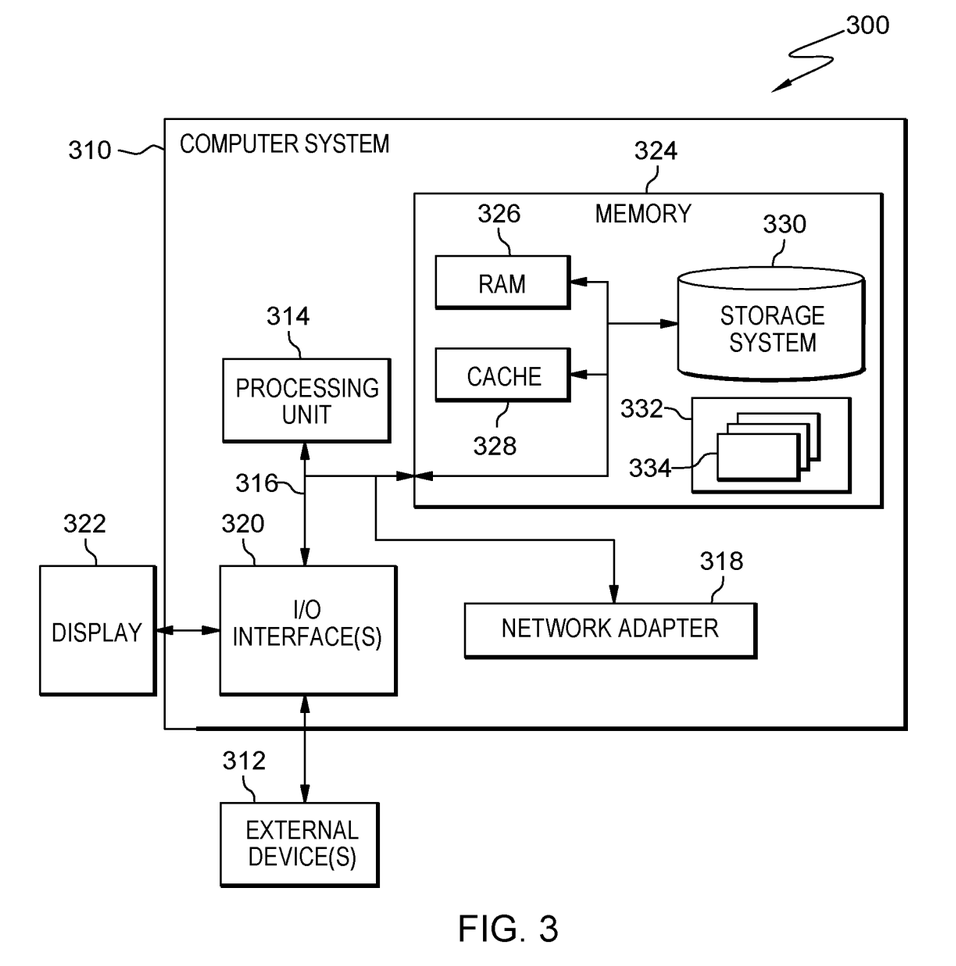
FIG. 3 is a block diagram depicting components of a data processing system, in accordance with an embodiment of the present invention.

FIG. 3 is a block diagram depicting components of a tape library management environment, such as tape library frame 102 of tape library management environment 100, generally designated 300, in accordance with an embodiment of the present invention. It should be appreciated that FIG. 3 provides only an illustration of one implementation and does not imply any limitations with regard to the environments in that different embodiments may be implemented. Many modifications to the depicted environment may be made.

In the illustrative embodiment, tape library frame 102 in a tape library management environment 100 is shown in the form of a general-purpose computing device, such as computer system 310. The components of computer system 310 may include, but are not limited to, one or more processors or processing unit(s) 314, memory 324 and bus 316 that couples various system components including memory 324 to processing unit(s) 314.

Bus 316 represents one or more of any of several types of bus structures, including a memory bus or memory controller, a peripheral bus, an accelerated graphics port and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus and Peripheral Component Interconnect (PCI) bus.

Computer system 310 typically includes a variety of computer system readable media. Such media may be any available media that is accessible by computer system 310 and it includes both volatile and non-volatile media, removable and non-removable media.

Memory 324 can include computer system readable media in the form of volatile memory, such as random access memory (RAM) 326 and/or cache memory 328. Computer system 310 may further include other removable/non-removable, volatile/non-volatile computer system storage media. By way of example only, storage system 330 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk") and an optical disk drive for reading from or writing to a removable, non-volatile optical disk, such as a CD-ROM, DVD-ROM or other optical media can be provided. In such instances, each can be connected to bus 316 by one or more data media interfaces. As will be further depicted and described below, memory 324 may include at least one computer program product having a set (e.g., at least one) of program modules that are configured to carry out the functions of embodiments of the invention.

Program/utility 332, having one or more sets of program modules 334, may be stored in memory 324 by way of example and not limitation, as well as an operating system, one or more application programs, other program modules and program data. Each of the operating systems, one or more application programs, other program modules and program data or some combination thereof, may include an implementation of a networking environment. Program modules 334 generally carry out the functions and/or methodologies of embodiments of the invention as described herein. Computer system 310 may also communicate with one or more external device(s) 312, such as a keyboard, a pointing device, a display 322, etc. or one or more devices that enable a user to interact with computer system 310 and any devices (e.g., network card, modem, etc.) that enable computer system 310 to communicate with one or more other computing devices. Such communication can occur via Input/Output (I/O) interface(s) 320. Still yet, computer system 310 can communicate with one or more networks, such as a local area network (LAN), a general wide area network (WAN) and/or a public network (e.g., the Internet) via network adapter 318. As depicted, network adapter 318 communicates with the other components of computer system 310 via bus 316. It should be understood that although not shown, other hardware and software components, such as microcode, device drivers, redundant processing units, external disk drive arrays, RAID systems, tape drives and data archival storage systems may be used in conjunction with computer system 310.

The present invention may be a system, a method and/or a computer program product. The computer program product may include a computer readable storage medium (or media) having computer readable program instructions thereon for causing a processor to carry out aspects of the present invention. In one embodiment, the computer readable storage medium having computer readable program instructions thereon may be internal to a tape library frame, such as tape library frame 102. In other embodiments, the computer readable storage medium having computer readable program instructions thereon may be stored external to a tape library frame, such as tape library frame 102, such that a server computer communicates with tape library frame 102 through a network connection to execute the computer readable program instructions on tape library frame 102.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable) or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems) and computer program products according to embodiments of the invention. It will be understood that each block of the flowchart illustrations and/or block diagrams and combinations of blocks in the flowchart illustrations and/or block diagrams, can be implemented by computer readable program instructions.

These computer readable program instructions may be provided to a processor of a general purpose computer, a special purpose computer or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus or other device to cause a series of operational steps to be performed on the computer, other programmable apparatus or other device to produce a computer implemented process, such that the instructions which execute on the computer, other programmable apparatus or other device implement the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace or to enable others of ordinary skill in the art to understand the embodiments disclosed herein.

The terminology used herein is for the purpose of describing particular embodiments only and is not intended to be limiting of the invention. It should be appreciated that any particular nomenclature herein is used merely for convenience and thus, the invention should not be limited to use solely in any specific function identified and/or implied by such nomenclature. Furthermore, as used herein, the singular forms of "a", "an", and "the" are intended to include the plural forms as well, unless the context clearly indicates otherwise.

What is claimed is:

1. An apparatus for tape library management, the apparatus comprising:
    a tape library frame;
    a tape gripper disposed within the tape library frame and integrated with a charge-coupled device (CCD) camera configured to read barcodes;
    the tape library frame having a storage slot that includes a plurality of mirrors integrated into an interior surface of the storage slot for projecting, in a direction toward a front side of the tape library frame, a reflection of a respective barcode affixed to each of a plurality of tape cartridges stored rearward of a frontmost tape cartridge in a tiered orientation within the storage slot, wherein the plurality of mirrors present the reflection to the tape gripper with the CCD camera for simultaneously reading the respective barcodes for each of the plurality of tape cartridges from a position facing toward a front side of the storage slot.

2. The apparatus of claim 1, wherein the plurality of mirrors are integrated into the interior surface of the storage slot beginning at a tier two position within the storage slot and ending at a last tier position within the storage slot.

3. The apparatus of claim 1, wherein a number of mirrors in the plurality of mirrors is equal to a number of tiers in the storage slot minus one.

4. The apparatus of claim 1, wherein each of the plurality of mirrors is oriented to form an obtuse angle with the interior surface of the storage slot, where a first portion of each of the plurality of mirrors is shifted backward towards a depth side of the storage slot, and where a second portion of each of the plurality of mirrors is shifted forward towards the front side of the storage slot.

5. The apparatus of claim 1, wherein each of the plurality of mirrors projects a reflection of the barcode affixed to each of the plurality of tape cartridges outward towards the front side of the storage slot.

6. The apparatus of claim 1, wherein the barcode affixed to each of the plurality of tape cartridges is affixed to a front portion of each of the plurality of tape cartridges, and extends to an additional portion of each of the plurality of tape cartridges.

7. The apparatus of claim 6, wherein the barcode that extends to the additional portion of each of the plurality of tape cartridges is copied in a reduced format from the barcode affixed to the front portion of each of the plurality of tape cartridges a number of times equal to a number of tiers in the storage slot minus one.

8. The apparatus of claim 7, wherein each copy of the barcode that extends to the additional portion of each of the plurality of tape cartridge are arranged laterally beginning at a portion of each of the plurality of tape cartridges adjacent to a left side of the storage slot and ending at a portion of each of the plurality of tape cartridges adjacent to a right side of the storage slot.

9. The apparatus of claim 8, wherein each of the plurality of mirrors is arranged in a staggered lateral layout beginning at a position opposite each copy of the barcode that extends to the additional portion of each of the plurality of tape cartridges.

10. The apparatus of claim 6, wherein the barcode that extends to the additional portion of each of the plurality of tape cartridges includes information about each respective tape cartridge from the plurality of tape cartridges.

11. The apparatus of claim 1, wherein the CCD camera is positioned in a direction toward the front side of the storage slot to read the reflection of the respective barcode for each of the plurality of tape cartridges stored rearward of the frontmost tape cartridge within without having to reposition the tape gripper within the tape library frame.

12. A method for tape library management, the method comprising:
    positioning, by one or more computer processors, a tape gripper integrated with a charge-coupled device (CCD) camera at a storage slot within a tape library frame, wherein the storage slot includes a plurality of tape cartridges and a plurality of mirrors integrated into an interior surface of the storage slot, and wherein the plurality of tape cartridges include a plurality of barcodes affixed to a portion of each of the plurality of tape cartridges;
    instructing, by the one or more computer processors, the tape gripper with the CCD camera to read a barcode affixed to a front portion of a first tape cartridge stored at a tier one position of the storage slot; and
    responsive to a determination that the barcode affixed to the front portion of the first tape cartridge differs from a last saved barcode for the tier one position of the storage slot, instructing, by the one or more computer processors, the tape gripper with the CCD camera to simultaneously read one or more barcode reflections for one or more additional tape cartridges stored in subsequent tier positions rearward of the first tape cartridge on a depth side of the storage slot utilizing the plurality of mirrors integrated into the interior surface of the storage slot.

13. The method of claim 12, further comprising:
    wherein the one or more barcode reflections are reflections of the plurality of barcodes affixed to a portion of each of the one or more additional tape cartridges stored in the subsequent tier positions within the storage slot; and
    wherein the reflections of the plurality of barcodes are projected outward towards the tape gripper at a front side of the storage slot via the plurality of mirrors integrated into the interior surface of the storage slot.

14. The method of claim 13, wherein each of the one or more barcode reflections are visible to the tape gripper with the CCD camera while the one or more additional tape cartridges are stored in the subsequent tier positions within the storage slot.

15. The method of claim 12, further comprising:
    responsive to updating the one or more last saved barcodes for the one or more additional tape cartridges, moving, by the one or more computer processors, the tape gripper with the CCD camera to one or more additional storage slots to read barcodes until a re-inventory operation for the tape library frame is complete.

16. A computer program product for tape library management, the computer program product comprising:
    at least one computer readable storage medium and program instructions stored on the at least one computer readable storage medium, the stored program instructions comprising:
        program instructions to, position a tape gripper integrated with a charge-coupled device (CCD) camera at a storage slot within a tape library frame, wherein the storage slot includes a plurality of tape cartridges and a plurality of mirrors integrated into an interior surface of the storage slot, and wherein the plurality of tape cartridges include a plurality of barcodes affixed to a portion of each of the plurality of tape cartridges;
        program instructions to instruct the tape gripper with the CCD camera to read a barcode affixed to a front portion of a first tape cartridge stored at a tier one position of the storage slot; and
        program instructions to, responsive to a determination that the barcode affixed to the front portion of the first tape cartridge differs from a last saved barcode for the tier one position of the storage slot, instruct the tape gripper with the CCD camera to simultaneously read one or more barcode reflections for one or more additional tape cartridges stored in subsequent tier positions rearward of the first tape cartridge on a depth side of the storage slot utilizing the plurality of mirrors integrated into the interior surface of the storage slot.

17. The computer program product of claim 16, further comprising:
    wherein the one or more barcode reflections are reflections of the plurality of barcodes affixed to a portion of each of the one or more additional tape cartridges stored in the subsequent tier positions within the storage slot; and
    wherein the reflections of the plurality of barcodes are projected outward towards the tape gripper at a front side of the storage slot via the plurality of mirrors integrated into the interior surface of the storage slot.

18. The computer program product of claim 17, wherein each of the one or more barcode reflections are visible to the CCD camera of the tape gripper while the one or more additional tape cartridges are stored in the subsequent tier positions within the storage slot.

19. The computer program product of claim 16, further comprising:
    program instructions to, responsive to updating the one or more last saved barcodes for the one or more additional tape cartridges, move the tape gripper with the CCD camera to one or more additional storage slots to read barcodes until a re-inventory operation for the tape library frame is complete.

20. A computer system for tape library management, the computer system comprising:
   one or more computer processors;
   at least one computer readable storage medium; and
   program instructions stored on the at least one computer readable storage medium for execution by at least one of the one or more computer processors, the stored program instructions comprising:
      program instructions to position a tape gripper integrated with a charge-coupled device (CCD) camera at a storage slot within a tape library frame, wherein the storage slot includes a plurality of tape cartridges and a plurality of mirrors integrated into an interior surface of the storage slot, and wherein the plurality of tape cartridges include a plurality of barcodes affixed to a portion of each of the plurality of tape cartridges;
      program instructions to instruct the tape gripper with the CCD camera to read a barcode affixed to a front portion of a first tape cartridge stored at a tier one position of the storage slot; and
      program instructions to, responsive to a determination that the barcode affixed to the front portion of the first tape cartridge differs from a last saved barcode for the tier one position of the storage slot, instruct the tape gripper with the CCD camera to simultaneously read one or more barcode reflections for one or more additional tape cartridges stored in subsequent tier positions rearward of the first tape cartridge on a depth side of the storage slot utilizing the plurality of mirrors integrated into the interior surface of the storage slot.

21. The computer system of claim 20, further comprising:
   wherein the one or more barcode reflections are reflections of the plurality of barcodes affixed to a portion of each of the one or more additional tape cartridges stored in the subsequent tier positions within the storage slot; and
   wherein the reflections of the plurality of barcodes are projected outward towards the tape gripper at a front side of the storage slot via the plurality of mirrors integrated into the interior surface of the storage slot.

22. The computer system of claim 21, wherein each of the one or more barcode reflections are visible to the CCD camera of the tape gripper while the one or more additional tape cartridges are stored in the subsequent tier positions within the storage slot.

* * * * *